United States Patent

Shih

[11] Patent Number: 5,823,181
[45] Date of Patent: Oct. 20, 1998

[54] HANDY OXYGEN GENERATOR

[76] Inventor: Chih-Sheng Shih, 3Fl., No. 5, Chien Kang Rd., Chungho, Taipei Hsien, Taiwan

[21] Appl. No.: 855,166

[22] Filed: May 13, 1997

[51] Int. Cl.[6] .......................... A61M 15/00; A61M 16/00; A62B 7/08; A62B 21/00
[52] U.S. Cl. ................. 128/202.26; 128/200.11; 128/200.24; 128/203.12; 128/203.21; 128/203.28; 128/203.29; 128/205.21
[58] Field of Search .................... 128/200.11, 200.24, 128/202.26, 203.12, 203.21, 203.28, 203.29, 204.18, 205.14, 205.15, 205.16, 205.18, 205.21

[56] References Cited

U.S. PATENT DOCUMENTS

| | | | |
|---|---|---|---|
| 3,615,252 | 10/1971 | DiPietro | 128/202.26 |
| 3,742,683 | 7/1973 | Sebest et al. | 128/202.26 |
| 4,548,730 | 10/1985 | Koslow | 128/202.26 X |
| 4,822,572 | 4/1989 | van der Smissen et al. | 128/202.26 X |
| 4,963,327 | 10/1990 | Russell | 128/202.26 X |
| 5,222,479 | 6/1993 | Brauer et al. | 128/202.26 |
| 5,690,101 | 11/1997 | Kutta | 128/205.27 |

*Primary Examiner*—Mickey Yu
*Assistant Examiner*—Dinh X. Nguyen
*Attorney, Agent, or Firm*—Pro-Techtor International Services

[57] ABSTRACT

A handy oxygen generator including a casing defining a reaction chamber, an air accumulator and an air passage between the reaction chamber and the air accumulator, a hand pump for pumping air into the reaction chamber to increase its inside pressure, a chemical module mounted in the reaction chamber and containing two separated chemicals, a plunger mounted on the reaction chamber for operation by hand to break the chemical module, enabling the two chemicals to induce a chemical reaction and to release oxygen into the air accumulator during the chemical reaction, an air outlet pipe with an air filter suspending in the air accumulator, and a mouthpiece connected to the air outlet pipe for the user to breathes in oxygen from the air accumulator.

6 Claims, 4 Drawing Sheets

HANDY OXYGEN GENERATOR

BACKGROUND OF THE INVENTION

The present invention relates to a handy oxygen generator which can be conveniently carried by the user and operated to release oxygen for breathing during an emergency case.

According to statistics, a high percentage of victims in fire accidents died from breathing in an excessive amount of carbon dioxide. Therefore, many of fire victims can survive if they have a personal respirator means.

SUMMARY OF THE INVENTION

It is one object of the present invention to provide an oxygen generator which releases oxygen for breathing through a chemical reaction. It is another object of the present invention to provide an oxygen generator which is handy and convenient for personal use in an emergent case. According to the preferred embodiment of the present invention, the handy oxygen generator comprises a casing defining a reaction chamber, an air accumulator and an air passage between the reaction chamber and the air accumulator, a hand pump for pumping air into the reaction chamber to increase its inside pressure, a chemical module mounted in the reaction chamber and containing two separated chemicals, plunger means mounted on the reaction chamber for operation by hand to break the chemical module, enabling the two chemicals to induce a chemical reaction and to release oxygen into the air accumulator during the chemical reaction, an air outlet pipe with air filter means suspending in the air accumulator, and a mouthpiece connected to the air outlet pipe for the user to breathes in oxygen from the air accumulator.

DETAILED DESCRIPTION OF THE PREFERRED EMBODIMENT

Figure 1:
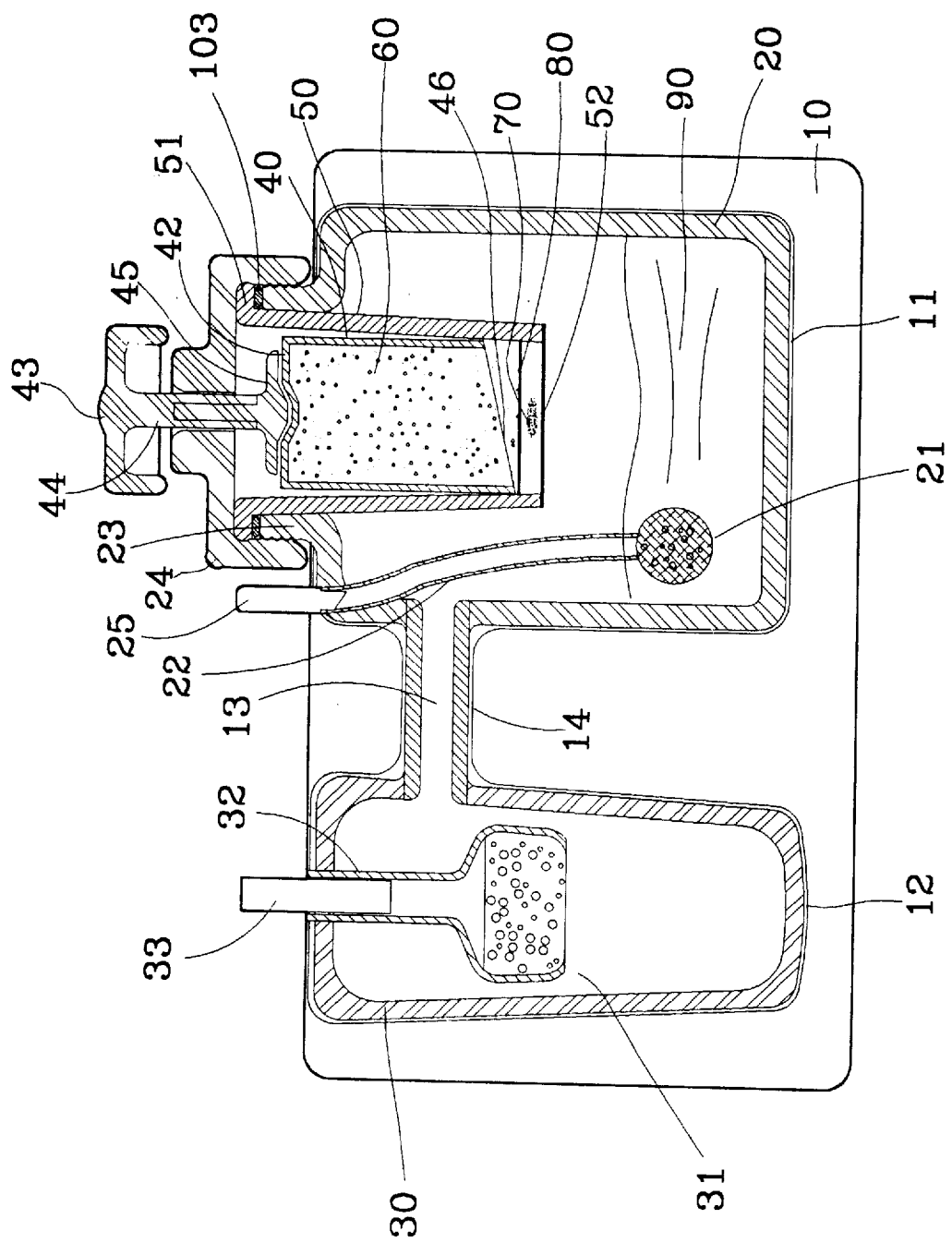
FIG. 1 is a sectional view of a handy oxygen generator according to the present invention.

Referring to FIG. 1, an oxygen generator in accordance with the present invention comprises a casing 10 defining a first vertical chamber 11, a second vertical chamber 12, and a transverse chamber 14 communicating between the first vertical chamber 11 and the second vertical chamber 12. A reaction chamber 20 and an air accumulator 30 are respectively mounted in the first vertical chamber 11 and the second vertical chamber 12. The reaction chamber 20 holds a certain amount (for example about 500 to 100 milliliters.) of water 90. A tube 13 is mounted in the transverse chamber 14 and connected between the reaction chamber 20 and the air accumulator 30. The reaction chamber 20 has an externally threaded mouth 23 disposed outside the casing 10 and covered with a screw cap 24. A barrel 50 is suspended inside the reaction chamber 20, having a top mounting flange 51 retained between the topmost edge of the mouth 23 of the reaction chamber 20 and the screw cap 24. The bottom side of the barrel 50 is an open side sealed with an aluminum foil 52. A gasket 103 is mounted within the screw cap 24 and retained between the top mounting flange 51 of the barrel 50 and the topmost edge of the mouth 23 of the reaction chamber 20. A press device is provided comprised of a plunger 44 inserted through a hole (not shown) at the center of the screw cap 24, a handle 43 connected to the top end of the plunger 44 and disposed outside the screw cap 24, and a stopper 45 connected to the bottom end of the plunger 44 and disposed inside the barrel 50. A water-permeable chemical container 40 is mounted inside the barrel 50 and containing a peroxide 60, having a concave top side 42 stopped below the stopper 45 and a bottom cutting edge 46. A partition wall 80 is provided inside the barrel 50 and spaced above the aluminum foil 52 below the bottom cutting edge 46 of the water-permeable chemical container 40. A catalyzer 70 is mounted in between the partition wall 80 and the aluminum foil 52 of the barrel 50. The ratio between the peroxide 60 and the catalyzer 70 is 0.5% to 10% by weight: 90% to 99.5% by weight. A guide tube 25 is mounted in the reaction chamber 20, having a bottom end coupled with a porous member 21 and a top end coupled with a connector 25 disposed outside the casing 10.

Figure 4:
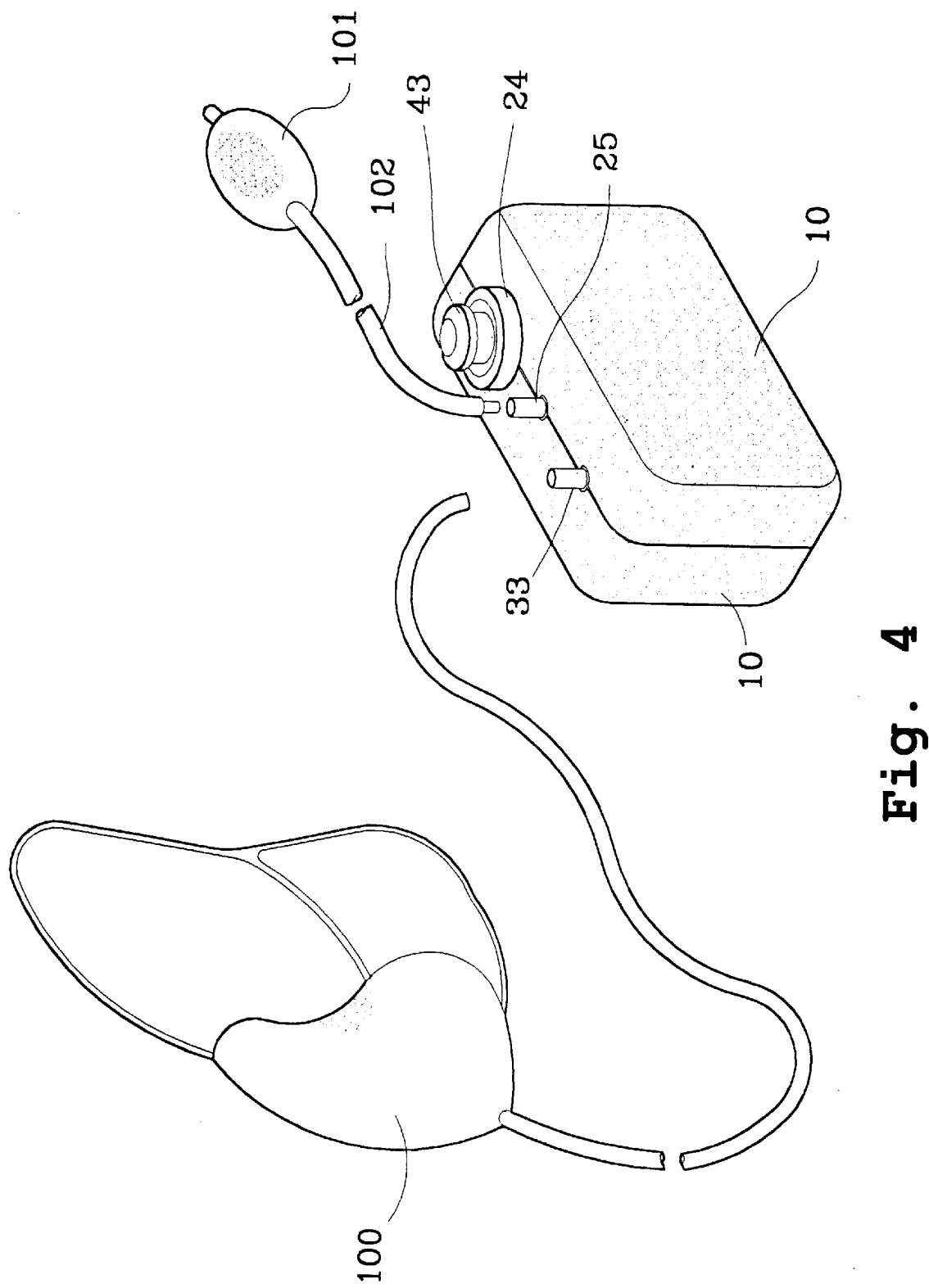
FIG. 4 is an elevational view of the present invention.

Referring to FIG. 4 and FIG. 1 again, a filter device 31 is mounted in the air accumulator 30, having an output tube 32 coupled with a connector 33 disposed outside the casing 10; a mouthpiece 100 is connected to the connector 33 to receive oxygen from the air accumulator 30; a hand pump 101 is connected to the connector 25 by a connecting tube 102. The filter device 31 comprises active carbon or active aluminum for removing solid matter from air passing through.

Figure 2:
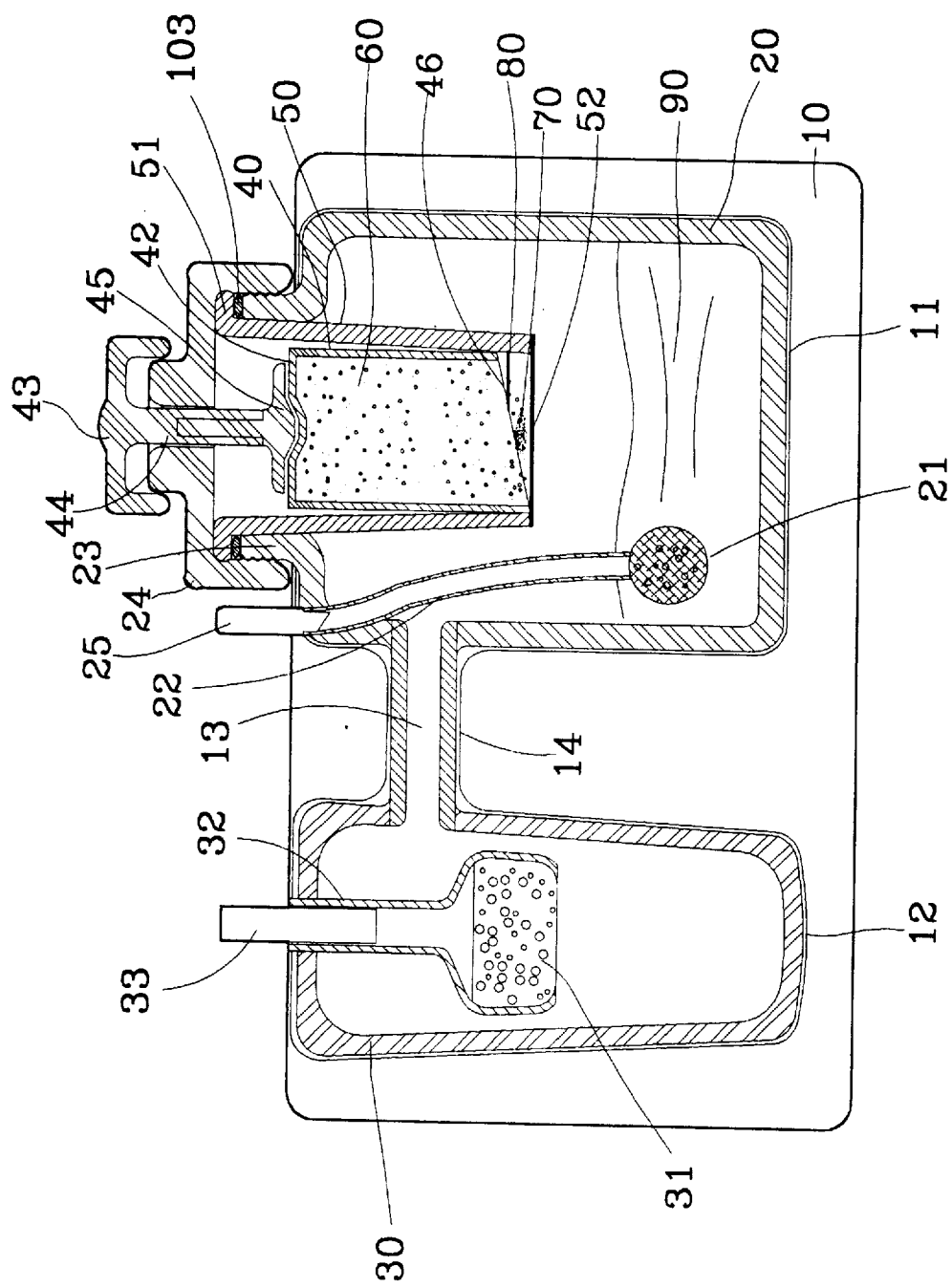
FIG. 2 is similar to FIG. 1 but showing the handle pressed down, the cutting edge of the chemical container cut through the partition wall.
Figure 3:
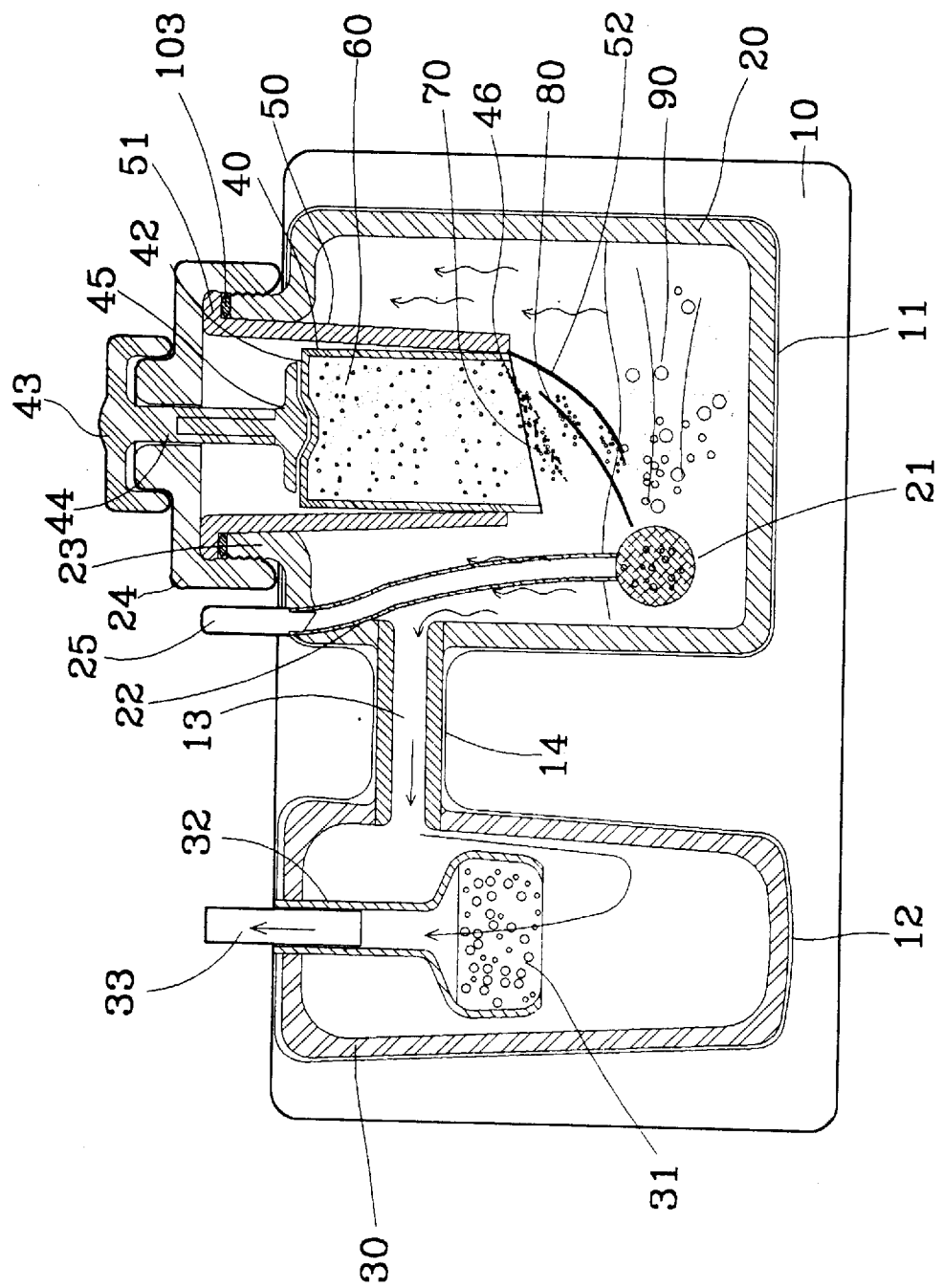
FIG. 3 is similar to FIG. 2 but showing the catalyzer mixed with the peroxide, oxygen released.

The operation of the present invention is outlined hereinafter with reference to FIGS. 2 and 3. When in an emergency case, the handle 43 is pressed down to force the stopper 45 downwardly against the concave top side 42 of the chemical container 40, causing the chemical container 40 to be moved downwards. When the chemical container 40 is moved downwards, the bottom cutting edge 46 of the chemical container 40 is forced to cut through the partition wall 80, causing the peroxide 60 to mix with the catalyzer 70. When the handle 43 is continuously pressed down, the bottom cutting edge 46 is forced to cut through the aluminum foil 52, thereby causing the mixture of the catalyzer 70 and the peroxide 60 to fall to water 90 in the reaction chamber 20. When the mixture of the catalyzer 70 and the peroxide 60 falls to water 90 in the reaction chamber 20, a reaction is induced to release oxygen. Released oxygen immediately passes through the tube 13 to the air accumulator 40, thus the user can breathes oxygen through the mouthpiece 100 via the filter device 31. The amount of oxygen thus obtained is sufficient for the user to breathes for about 15 to 50 minutes (normally set for about 30 minutes). The barrel 50, the chemical container 40 and the catalyzer 70 are made in a pack convenient for a replacement. The hand pump 101 is adapted to pump air into the reaction chamber 20 to increase its inside pressure, so that released oxygen can be forced out of the reaction chamber 20 into the air accumulator 30. Further, when the hand pump 101 is detached from the connector 25, outside air can be directly drawn into water 90 in the reaction chamber 20 through the porous member 21 and then forced by the inside pressure of the reaction chamber 25 into the oxygen accumulator 30 for breathing.

While only one embodiment of the present invention has been shown and described, it will be understood that various modifications and changes could be made thereunto without departing from the spirit and scope of the invention disclosed.

What the invention claimed is:

1. A handy oxygen generator comprising:

a casing defining a reaction chamber, an air accumulator, and an air passage between said reaction chamber and said air accumulator, said reaction chamber having a top-open mouth covered with a screw cap;

an air intake pipe mounted in said reaction chamber, said air intake pipe having a bottom end coupled with an air filter element suspending inside said reaction chamber, and a top end coupled with a connector disposed outside said reaction chamber;

an air pump connected to the connector of said air intake pipe and operated to pump air into said reaction chamber through said air intake pipe;

a chemical module mounted in said reaction chamber and retained in place by said screw cap, said chemical module comprising a first chemical, a second chemical, and partition means adapted to separate said first chemical from said second chemical;

plunger means mounted in a hole in said screw cap and having a handle disposed outside said screw cap for operation by hand;

an air outlet pipe mounted in said air accumulator, said air outlet pipe having a bottom end coupled with air filter means suspending in said air accumulator, and a top end coupled with a connector disposed outside said air accumulator; and a mouthpiece connected to the connector of said air outlet pipe for breathing in air from said air outlet pipe;

wherein when said plunger means is pressed down, said partition means of said chemical module is broken, causing said first chemical to mix with said second chemical and to induce a chemical reaction and to release oxygen during the chemical reaction, permitting released oxygen to pass from said reaction chamber into said air accumulator through said air passage and then to be breathed in by the user through said mouthpiece via said air outlet pipe.

2. The handy oxygen generator of claim 1, wherein said reaction chamber contains about 500 to 100 milliliters water in which the air filter element of said air intake pipe is dipped.

3. The handy oxygen generator of claim 1, wherein said first chemical is a peroxide, and said second chemical is a catalyzer which catalyzes said peroxide, causing it to induce a chemical reaction and to release oxygen during its chemical reaction.

4. The handy oxygen generator of claim 3, wherein the ratio between said peroxide and said catalyzer is 0.5% to 10% by weight: 90% to 99.5% by weight.

5. The handy oxygen generator of claim 1, wherein the air filter means of said air outlet pipe contains active carbons.

6. The handy oxygen generator of claim 1, wherein the air filter means of said air outlet pipe contains active aluminum.

\* \* \* \* \*